Dec. 8, 1964    A. C. SMITH    3,160,435
AUTOMOTIVE VEHICLE WITH SLEEPING COMPARTMENT
Filed April 5, 1963
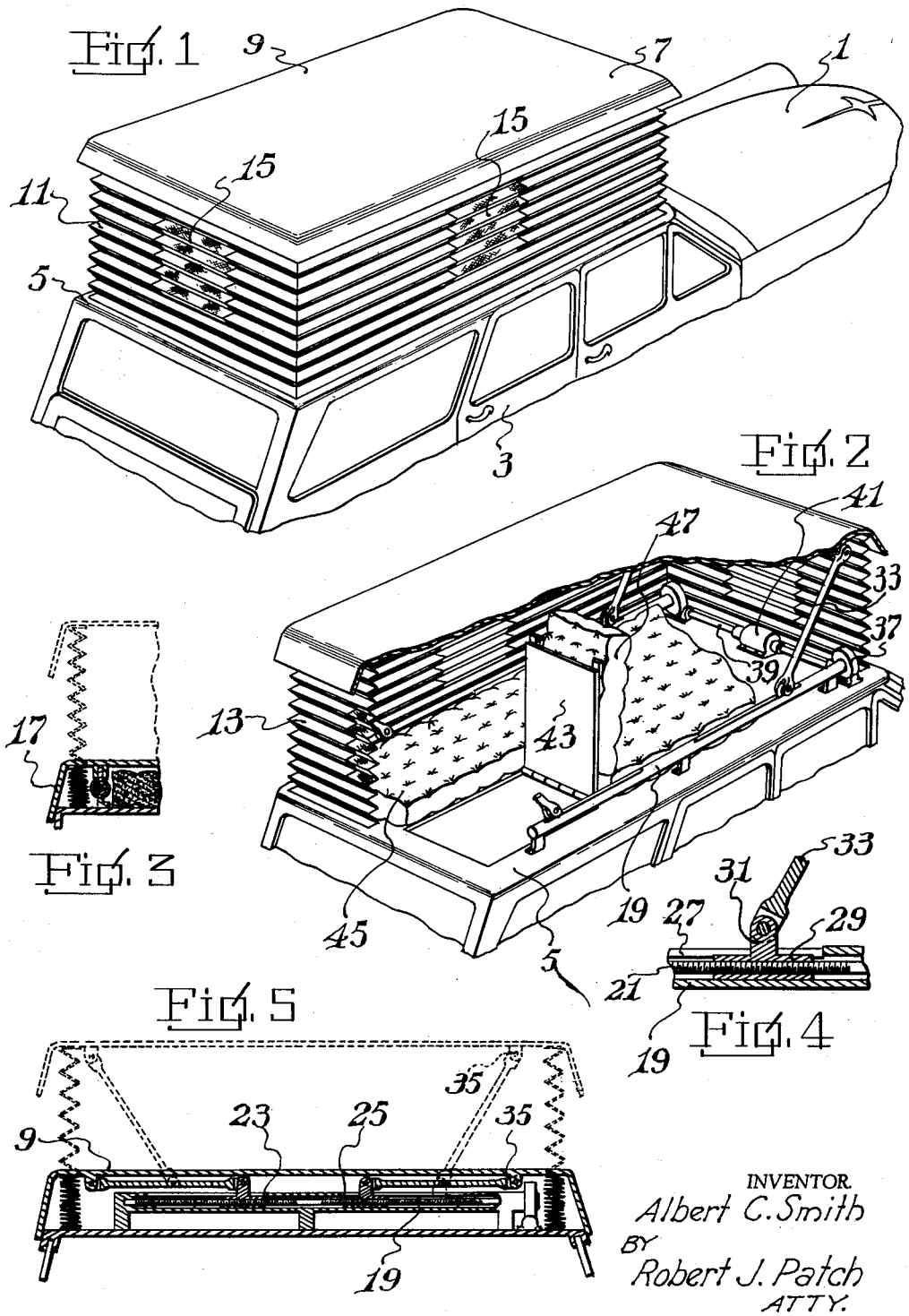
INVENTOR.
Albert C. Smith
BY
Robert J. Patch
ATTY.

United States Patent Office 3,160,435
Patented Dec. 8, 1964

3,160,435
AUTOMOTIVE VEHICLE WITH SLEEPING
COMPARTMENT
Albert C. Smith, 11410 E. Newton Place, Tulsa, Okla.
Filed Apr. 5, 1963, Ser. No. 271,023
1 Claim. (Cl. 296—23)

The present invention relates to automotive vehicles that carry, an auxiliary enclosure that may be used for a sleeping compartment, more particularly to the structure of the sleeping compartment and its relationship to the vehicle.

It is an object of the present invention to provide an automotive vehicle with sleeping compartment and a sleeping compartment for the roof of an automotive vehicle, which is secure against unauthorized entry.

Another object of the present invention is the provision of such an automotive vehicle and sleeping compartment that is adapted to be easily entered and left.

Still another object of the present invention is the provision of such an automotive vehicle and sleeping compartment characterized in that the sleeping compartment may be readily erected and collapsed.

A still further object of the present invention is the provision of such an automotive vehicle and sleeping compartment that will be weatherproofed when collapsed.

Finally, it is an object of the present invention to provide such an automotive vehicle and sleeping compartment that will be relatively simple and inexpensive to manufacture, easy to install, operate, maintain and repair, and rugged and durable in use.

Other objects and advantages of the present invention will become apparent from a consideration of the following description, taken in connection with the accompanying drawing, in which:

FIGURE 1 is a fragmentary perspective view of an automotive vehicle having a sleeping compartment according to the present invention, with the sleeping compartment in erected condition;

FIGURE 2 is a view similar to FIGURE 1 but with parts broken away to show the interior of the sleeping compartment;

FIGURE 3 is a fragmentary cross-sectional view of the sleeping compartment showing the sleeping compartment collapsed in full-line position and erected in broken-line position;

FIGURE 4 is an enlarged fragmentary cross-sectional view of a portion of the operating mechanism of the sleeping compartment; and FIGURE 5 is a fragmentary cross-sectional view of the operating mechanism of the sleeping compartment in the collapsed position in full line and in the erected position in broken line.

Referring now to the drawing in greater detail, there is shown an automotive vehicle indicated at 1, of the station wagon type. It will be understood, of course, that automotive vehicles other than station wagons can also be used in the present invention. Vehicle 1 has the usual doors 3 and a roof 5 which preferably tends to be flat. However, commercial models of station wagons and other automotive vehicles have roofs that are quite suitably flat, so that no special structure of automotive vehicle is needed.

Mounted on top of roof 5 is the sleeping compartment 7 of the present invention, which includes a flat top 9 and four accordion side walls 11 secured along their upper edges to the underside of top 9 and along their lower edges to the upper side edges of roof 5. Accordion side walls 11 may be made up of a plurality of horizontal slats 13 pivotally secured together by means of sheets of flexible plastic or canvas or the like, according to well-known constructions, by which a flexible and collapsible yet waterproof side wall construction is provided. A plurality of windows 15 are also provided in side walls 11, for the admission of light and air. Windows 15 may for example be of flexible slatted screen construction and may be metallic or fabric or the like.

Side edges 17 depend from the outer edges of top 9. If the material of top 9 is metal or glass fiber reinforced with plastic or other readily formable material, then downwardly depending side edges 17 may be simply bent from or formed in the material of top 9 during manufacture. In any event, side edges 17 are of a depth such that when side walls 11 are collapsed as in the full-line positions of FIGURES 3 and 5, side edges 17 will extend downwardly a distance at least as great as, and preferably substantially greater than, the collapsed height of side walls 11. It is also preferable that side edges 17 not only contact roof 5 but overlap and extend downwardly below the upper portions of roof 5 in the overlapping and weather-sealing relationship shown in FIGURES 3 and 5. In this way, even driving rainfall cannot get into the sleeping compartment when it is collapsed. At the same time, the appearance of roof 5 is not undesirably altered, when the sleeping compartment is collapsed, from what it would be if no sleeping compartment were provided.

Mechanism is provided for erecting and collapsing the sleeping compartment, comprising a pair of parallel horizontal guide tubes 19 secured to the upper side of roof 5 along the opposite longitudinal side edges thereof. Guide tubes 19 are stationary and are hollow, and provide bearings for rotatable shafts 21 journaled therein, one to each tube 19. Each shaft 21 has oppositely screw-threaded end portions 23 and 25 thereon. Each guide tube 19 has slots 27 extending lengthwise through the upper wall thereof. Each of screw-threaded end portions 23 and 25 has an internally screw-threaded collar 29 screw-threadedly engaged therewith and mounted thereon, each collar 29 terminating upwardly in an ear 31 that extends through the associated slot 27 and provides a pivotal interconnection with the lower end of a link 33 that at its upper end is pivotally interconnected to the underside of top 9 by means of an ear 35 depending from the underside of top 9.

In this way, conjoint rotation of both shafts 21 will cause the collars 29 on each shaft 21 to approach each other or to diverge from each other. When the collars approach each other, the sleeping compartment collapses to the position shown in full line in FIGURE 5. When the collars diverge from each other, the sleeping compartment is erected to the broken-line position of FIGURE 5. The slack or play in accordion side walls 11 is such that ears 35 reach the ends of their respective slots 27 before the sleeping compartment is too greatly erected or collapsed.

Means for automatically operating the sleeping compartment are provided, comprising a gear reduction 37 at the end of each shaft 21, which is in train with a drive shaft 39 extending from each end of a small electric motor 41 mounted on roof 5. Actuation of motor 41 by one of a pair of switches (not shown) accessible to the driver of the vehicle can erect or collape the sleeping compartment from within the automotive vehicle without the need for getting out of the vehicle in bad weather and without the need for getting inside the compartment until it is fully erected. Limit switches (not shown) deactuate motor 41 at the extremes of movement of the mechanism.

Means for getting into the sleeping compartment from the interior of the vehicle are provided, comprising a trap door 43 that swings vertically about a horizontal axis to close or open an opening in roof 5. Preferably, trap door 43 comprises a portion of roof 5. A mattress 45 covers roof 5 within the sleeping enclosure and has a movable section 47 that swings upwardly with trap door 43.

It will therefore be apparent that not only is access to the interior of the sleeping compartment provided from within the vehicle, but also there is no need to provide a door or other opening through the side walls of the sleeping compartment. This in turn means that the locks on the vehicle doors 3 serve also as the locks for the sleeping compartment. Unauthorized entry into the sleeping compartment is thus prevented to the same extent that unauthorized entry into the vehicle is prevented. All that is necessary is to lock the vehicle from within, erect the sleeping compartment, raise the trap door, enter the sleeping door, close the trap door, and sleep in comfort and safety. After sleeping, the trap door is raised, the occupant re-enters the vehicle proper and closes the trap door, actuates the sleeping compartment mechanism to collapse the sleeping compartment, and can drive off with no need to leave the vehicle from the time the vehicle is parked until the time the vehicle is operated again.

It will therefore be apparent that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claim.

What is claimed is:

In combination with an automotive vehicle having a roof and sides, a sleeping compartment mounted on the roof of the vehicle and comprising a rigid top and a plurality of side walls which are flexible to permit raising and lowering the top, the rigid top including downwardly depending marginal flanges that extend below the roof of the vehicle and overlie and contact the sides of the vehicle on all sides of the vehicle and entirely about said rigid top in the lowered position of the top, means for raising and lowering the top, said means comprising a pair of rotatable shafts extending lengthwise of the vehicle, each shaft having oppositely screw-threaded end portions, screw-threaded collars mounted one on each screw-threaded end portion of each shaft, each collar having an upstanding ear, a stationary horizontal guide tube fixedly secured along each side of the vehicle and extending lengthwise of the vehicle, each tube having at least one slot therethrough extending lengthwise of the upper side of the tube, one of said shafts being disposed in each of said tubes with each said ear extending upwardly through a said slot, rigid links swingably interconnecting said ears and said rigid top, the links associated with each said shaft extending upwardly away from each other, and drive means for simultaneously rotating both shafts selectively in either direction thereby simultaneously to move toward or away from each other both members of the pair of collars associated with each shaft so as to lower or raise said rigid top, respectively, said drive means comprising a motor mounted on said roof at one end of said roof and beneath said rigid top, drive shaft means extending in opposite directions from said motor, and means drivingly interconnecting the ends of the drive shaft means and one end of each of said screw-threaded shafts.

References Cited by the Examiner

UNITED STATES PATENTS

| | | | |
|---|---|---|---|
| 2,183,111 | 12/39 | Tesmer | 296—23 X |
| 2,243,659 | 5/41 | Thompson | 296—23 |
| 2,729,497 | 1/56 | Runyan | 296—23 |

FOREIGN PATENTS 702,982  2/41  Germany.

A. HARRY LEVY, Primary Examiner.